June 5, 1923.

A. J. PETRIE 1,457,456

DISK WHEEL

Filed March 20, 1922

INVENTOR.
August J. Petrie
BY
Morsell + Keeney
ATTORNEYS.

Patented June 5, 1923.

1,457,456

UNITED STATES PATENT OFFICE.

AUGUST J. PETRIE, OF WEST ALLIS, WISCONSIN, ASSIGNOR TO MILWAUKEE STAMPING CO., OF WEST ALLIS, WISCONSIN, A CORPORATION OF WISCONSIN.

DISK WHEEL.

Application filed March 20, 1922. Serial No. 545,301.

*To all whom it may concern:*

Be it known that I, AUGUST J. PETRIE, a citizen of the United States, and resident of West Allis, in the county of Milwaukee and State of Wisconsin, have invented new and useful Improvements in Disk Wheels, of which the following is a description, reference being had to the accompanying drawings, which are a part of this specification.

This invention relates to disk wheels and more particularly to a wheel of this type which is especially adapted for use upon small wagons and other similar toys for children and has for its object to provide a device of this character which will be simple in construction, comparatively inexpensive to manufacture and more efficient in use than those which have been heretofore proposed.

A further object of the invention is to provide a disk wheel comprising two identical sheet metal stampings which may be suitably secured together in order to form the completed wheel.

A still further object of the invention is to provide a wheel of this character in which the two sections are so constructed and secured together as to permit of the use of a relatively inexpensive tubular member to form the hub and bearing portion of the wheel.

With these and other objects in view the invention consists in the novel details of construction and combinations of parts more fully hereinafter disclosed and particularly pointed out in the claims.

Figure 1:
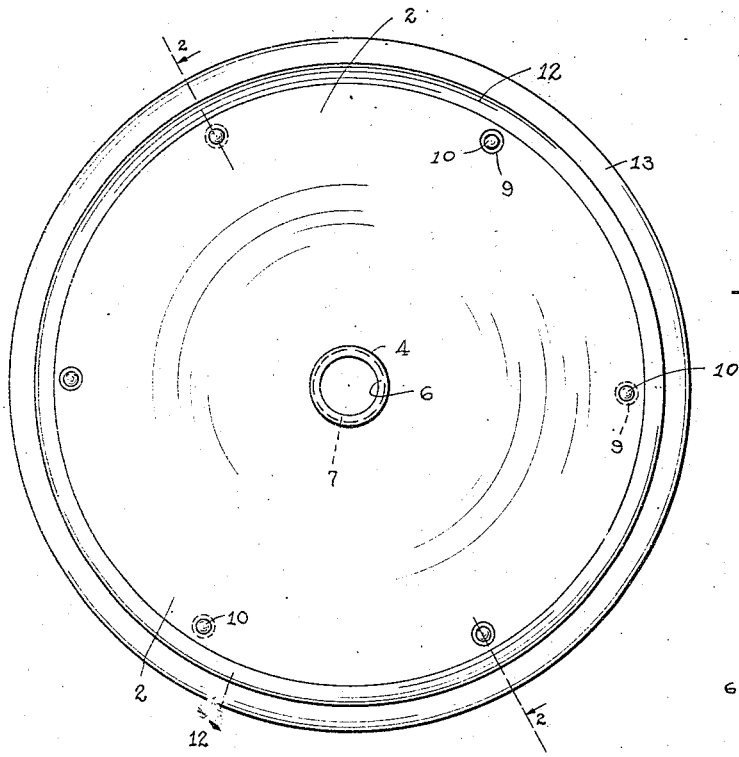
Figure 2:
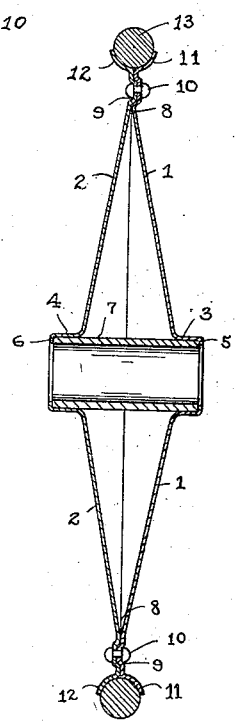

Referring to the accompanying drawings in which like numerals designate like parts in all the views:

Figure 1 is a diagrammatic side elevational view of a wheel made in accordance with the present invention, a solid rubber or other tire being shown in place thereon; and Fig. 2 is a central sectional view of the parts shown in Fig. 1 taken on the line 2—2 of the said figure.

Referring to the drawings it will be seen that the construction comprises a pair of sheet metal disk members 1 and 2 of dished formation, which members are provided at their center portions with the annular extensions or bosses 3 and 4, respectively, the extreme ends of the said bosses being turned inwardly during the manufacture of the wheel, as at 5 and 6, providing annular flanges which are adapted to retain the tubular member 7 in position at the center of the wheel, whereby the same may form an efficient hub and bearing member. The main body portions of the disks 1 and 2 are inclined to the vertical, substantially as shown in Fig. 2, so that when the wheel is assembled they will converge and meet at a point 8 adjacent the outer circumference of the wheel. Just outside of the meeting point 8 the said disks are provided with a plurality of stamped depressions 9, the direction of which depressions preferably alternates; that is to say, one depression will be made toward the right in Fig. 2 while the next one will be toward the left, as seen in the said figure, so that the said members 1 and 2 may be in all respects identical and yet may accurately and perfectly fit together when they are assembled. The said depressions thus stamped in the faces of the disk members of course provide raised portions or bosses on the other side thereof, which bosses are adapted to register with and engage the corresponding depressions of the companion wheel members.

The said members are drilled or otherwise provided with openings centrally located in the said depressions, through which rivets 10 or other securing means may pass to rigidly secure the members 1 and 2 together.

The outermost circumferences of the disk members 1 and 2 are formed with the curved flanges 11 and 12, respectively, which are adapted to co-act when the parts are assembled to provide a substantially semi-circular annular felly which may receive and hold the solid rubber or other tire 13 in the usual manner.

Although not confined to wheels for children's toys, the invention provides an exceedingly inexpensive construction for such wheels whereby they may be readily and quickly manufactured with the fewest possible number of parts. The construction, as above disclosed, results in the production of an exceedingly strong and rigid wheel which is well adapted to withstand the hard usage to which wheels of this type are generally subjected.

It is obvious that those skilled in the art may vary the details of construction as well as the precise arrangement of parts without departing from the spirit of the invention and therefore it is not wished to be limited to the above disclosure except as required by the claims.

What is claimed is:

1. A device of the class described comprising a pair of substantially identical dished sheet metal disk members provided with integral annular hub portions having inturned flanges adapted to engage a bearing member, said disk members being also provided with alternately projecting bosses adapted to co-act to position said members in alinement; a bearing member mounted within said hub portions; and means for securing said disk members together, whereby said flanges may be caused to engage said bearing member to retain it in position.

2. A device of the class described comprising a pair of substantially identical dished sheet metal disk members provided with integral annular hub portions having inturned flanges adapted to engage a bearing member, said disk members being also provided with alternately projecting bosses adjacent their outer circumference adapted to co-act to position said members in alinement; a bearing member mounted within said hub portions; and means associated with said alining bosses for securing said disk members together, whereby said flanges may be caused to engage said bearing member to retain it in position.

3. A device of the class described comprising a pair of substantially identical dished sheet metal disk members provided with integral annular hub portions having inturned flanges adapted to retain a bearing member, said disk members being also provided with a plurality of alternately projecting perforated bosses adjacent their outer circumference adapted to register to position said members in alinement, and the extreme outer circumference of said members being provided with flanges adapted to form a felly; a bearing member mounted within said hub portions; and means passing through the perforations in said bosses, adapted to secure said disk members together.

4. A device of the class described comprising a pair of substantially identical disk members of conical formation and having projecting annular hub portions, and alternately raised and depressed portions, said raised and depressed portions spaced from said hub portions interfitting to prevent independent movement of said disk members, and means for securing the disk members together.

In testimony whereof, I affix my signature.

AUGUST J. PETRIE.